(12) United States Patent
Sethi et al.

(10) Patent No.: US 12,659,320 B2
(45) Date of Patent: Jun. 16, 2026

(54) EDGE-BASED THREAT INTELLIGENCE SHARING

(71) Applicant: DELL PRODUCTS L.P., Round Rock, TX (US)

(72) Inventors: Parminder Singh Sethi, Punjab (IN); Srinath Kappgal, Cork (IE); Malathi Ramakrishnan, Madurai (IN); Daniel L. Hamlin, Round Rock, TX (US); Praveen Kumar, Noida (IN)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 18/409,084

(22) Filed: Jan. 10, 2024

(65) Prior Publication Data
US 2025/0227115 A1 Jul. 10, 2025

(51) Int. Cl.
H04L 9/40 (2022.01)
H04L 41/16 (2022.01)
H04L 43/20 (2022.01)

(52) U.S. Cl.
CPC .......... H04L 63/1416 (2013.01); H04L 41/16 (2013.01); H04L 43/20 (2022.05)

(58) Field of Classification Search
CPC ....... H04L 43/20; H04L 43/026; H04L 43/08; H04L 41/16; H04L 63/1416; H04L 63/1425
See application file for complete search history.

(56) References Cited

U.S. PATENT DOCUMENTS

| | | | |
|---|---|---|---|
| 7,647,623 | B2 | 1/2010 | Robert et al. |
| 7,814,542 | B1 | 10/2010 | Day |
| 7,873,038 | B2 | 1/2011 | LaVigne et al. |
| 7,903,655 | B2 | 3/2011 | Gooch et al. |
| 8,675,652 | B2 | 3/2014 | LaVigne et al. |
| 8,910,275 | B2 | 12/2014 | Madhavan et al. |
| 11,489,876 | B2 | 11/2022 | Pope et al. |
| 2008/0212579 | A1 | 9/2008 | LaVigne et al. |
| 2009/0013404 | A1 | 1/2009 | Chow et al. |
| 2013/0031621 | A1 | 1/2013 | Jenne et al. |
| 2023/0079074 | A1 | 3/2023 | Cella et al. |
| 2023/0180005 | A1 | 6/2023 | Kim et al. |
| 2023/0259081 | A1 | 8/2023 | Cella et al. |
| 2024/0022486 | A1* | 1/2024 | Lyon ....................... H04L 43/20 |
| 2024/0414175 | A1* | 12/2024 | Jiang ....................... H04L 41/16 |

* cited by examiner

*Primary Examiner* — Kyung H Shin
(74) *Attorney, Agent, or Firm* — Jackson Walker L.L.P.

(57) ABSTRACT

In a system for providing threat intelligence sharing including a plurality of edge nodes, each edge node may monitor a real-time data stream representing data being processed by the edge node. The edge node may identify a potential security threat indicated by at least a portion of the real-time data stream. In response to identifying the potential security threat, the edge may trigger an automated response action, and communicate a description of the identified potential security threat to the other edge nodes in the plurality of edge nodes.

14 Claims, 3 Drawing Sheets

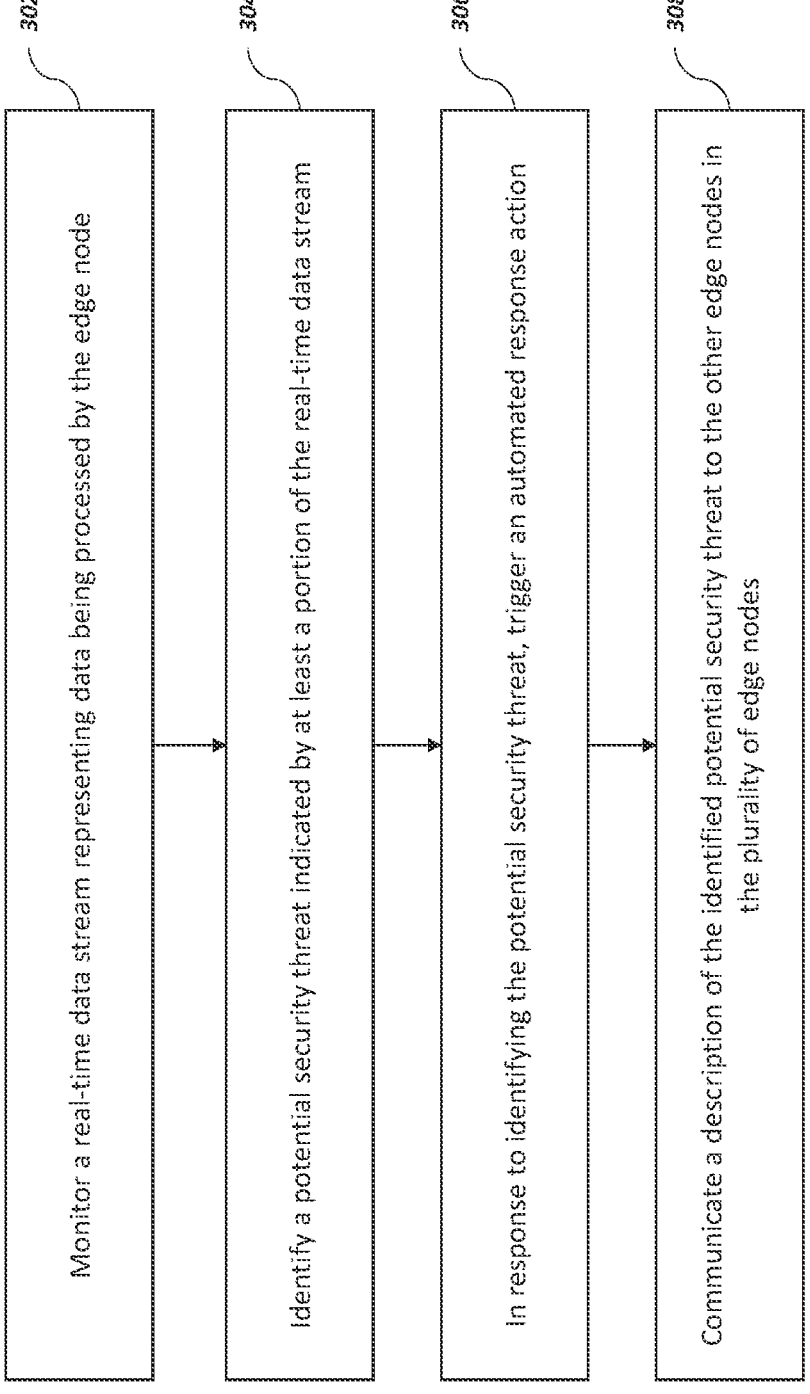

302 — Monitor a real-time data stream representing data being processed by the edge node 304 — Identify a potential security threat indicated by at least a portion of the real-time data stream 306 — In response to identifying the potential security threat, trigger an automated response action 308 — Communicate a description of the identified potential security threat to the other edge nodes in the plurality of edge nodes

EDGE-BASED THREAT INTELLIGENCE SHARING

TECHNICAL FIELD

The present disclosure relates in general to information handling systems, and more particularly to techniques for threat intelligence sharing in information handling systems, and particular in edge networks.

BACKGROUND OF THE INVENTION

As the value and use of information continues to increase, individuals and businesses seek additional ways to process and store information. One option available to users is information handling systems. An information handling compiles, system generally processes, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware application programs hosted by the guest resources and operating system.

In many HCI implementations, an administrator may use a centralized management system (e.g., a cloud-based system, or in general any information handling system communicatively coupled to the HCI nodes via a network). The centralized management system may communicate with HCI nodes individually to perform various management tasks such as provisioning, monitoring, upgrading, etc.

It should be noted that the discussion of a technique in the Background section of this disclosure does not constitute an admission of prior art status. No such admissions are made herein, unless clearly and unambiguously identified as such.

SUMMARY OF THE INVENTION

In accordance with the teachings of the present disclosure, disadvantages and problems s associated with management of information handling systems may be reduced or eliminated.

In accordance with embodiments of the present disclosure, a system for detecting security threats in an edge network may include a plurality of edge nodes, each edge node including at least one processor and a memory and being in communication with at least one other edge node via a communications network. Each edge node may be configured to perform operations including monitoring a real-time data stream representing data being processed by the edge node; identifying a potential security threat indicated by at least a portion of the real-time data stream; in response to identifying the potential security threat, triggering an automated response action; and communicating a description of the identified potential security threat to the other edge nodes in the plurality of edge nodes.

In some implementations, each edge node may be configured to update a machine-learning model based on an actual threat determination associated with the identified potential security threat, wherein the machine-learning model is configured to identify potential security threats.

In some cases, identifying the potential security threat is based on the machine-learning model.

In some embodiments, the machine-learning model is stored in the memory of the edge node.

In some cases, the automated response action is one of quarantining one or more edge nodes in the plurality of edge nodes, alerting security personnel, or alerting a security system in the edge network.

In some implementations, identifying the potential security threat includes detecting a network anomaly indicated by at least the portion of the real-time data stream.

In some embodiments, identifying the potential security threat includes detecting suspicious network behavior by one or more of the plurality of edge nodes indicated by at least the portion of the real-time data stream.

In some cases, communicating the description of the identified potential security threat to the other edge nodes in the plurality of edge nodes includes communicating the description to at least one other edge node, and wherein the communicated description is propagated to the remaining plurality of edge nodes.

In accordance with embodiments of the present disclosure, a method for detecting security threats in an edge network including a plurality of edge nodes, each edge node including at least one processor and a memory and being in communication with at least one other edge node via a communications network, includes monitoring a real-time data stream representing data being processed by the edge node; identifying a potential security threat indicated by at least a portion of the real-time data stream; in response to identifying the potential security threat, triggering an automated response action; and communicating a description of the identified potential security threat to the other edge nodes in the plurality of edge nodes.

In accordance with embodiments of the present disclosure, an article of manufacture includes a non-transitory, computer-readable medium having computer-executable instructions thereon that are executable by a processor of an edge node of an information handling system including a plurality of edge nodes for: monitoring a real-time data stream representing data being processed by the edge node; identifying a potential security threat indicated by at least a portion of the real-time data stream; in response to identifying the potential security threat, triggering an automated response action; and communicating a description of the identified potential security threat to the other edge nodes in the plurality of edge nodes.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE SEVERAL VIEWS OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates a block diagram of another example of an information handling system, in accordance with embodiments of the present disclosure.

DETAILED DESCRIPTION OF THE INVENTION

In general, an edge network is a configuration where data processing is performed by computing devices (edge nodes) that are situated at the "edge" of the network (i.e., close to clients and users of the network), as opposed to being formed in centralized computing devices in a cloud computing system. Existing edge environments generally lack a robust framework for identifying potential security threats in the network. Potential security threats may include, for example, malicious software such as viruses, malware, root kits, or other unauthorized software executing on or attempting to access the edge nodes of an edge network. Potential security threats may also include unauthorized access to or use of the edge nodes of the edge network. Edge nodes generally have limited threat detection capability, which hampers their ability to detect and respond to emerging threats efficiently. Moreover, centralized threat intelligence systems raise concerns regarding data privacy and security. Delayed transmission of threat information from edge nodes to centralized systems results in a lack of real-time threat awareness. Inefficient collaboration and information sharing among edge devices hinder the collective identification and response to emerging threats.

The present disclosure addresses these and other issues with edge networks by describing a decentralized system architecture for edge devices to share anonymized threat intelligence securely. Threat detection capabilities are enhanced at the edge of the network by equipping edge nodes with various threat detection capabilities, such as intrusion detection systems or behavior analytics. Anonymization and aggregation techniques are utilized to preserve privacy while sharing threat intelligence between the edge nodes of the network. This threat intelligence can be share in real-time among edge nodes to enhance threat awareness in the edge network as a whole. Trust and validation mechanisms may be utilized to ensure the authenticity and integrity of shared threat intelligence. This shared threat intelligence may enable edge nodes to take mitigation actions in order to contain, limit, or prevent negative effects to the edge network resulting from the identified threat. A feedback loop may be implemented to continuously improve threat detection capabilities and refine threat intelligence sharing protocols among the edge nodes, such as, for example, by continuously updating machine-learning models configured to identify potential threats based on newly identified potential threats. Due to the sensitive nature of data processed in edge network, security and privacy considerations may be prioritized.

Figure 1:
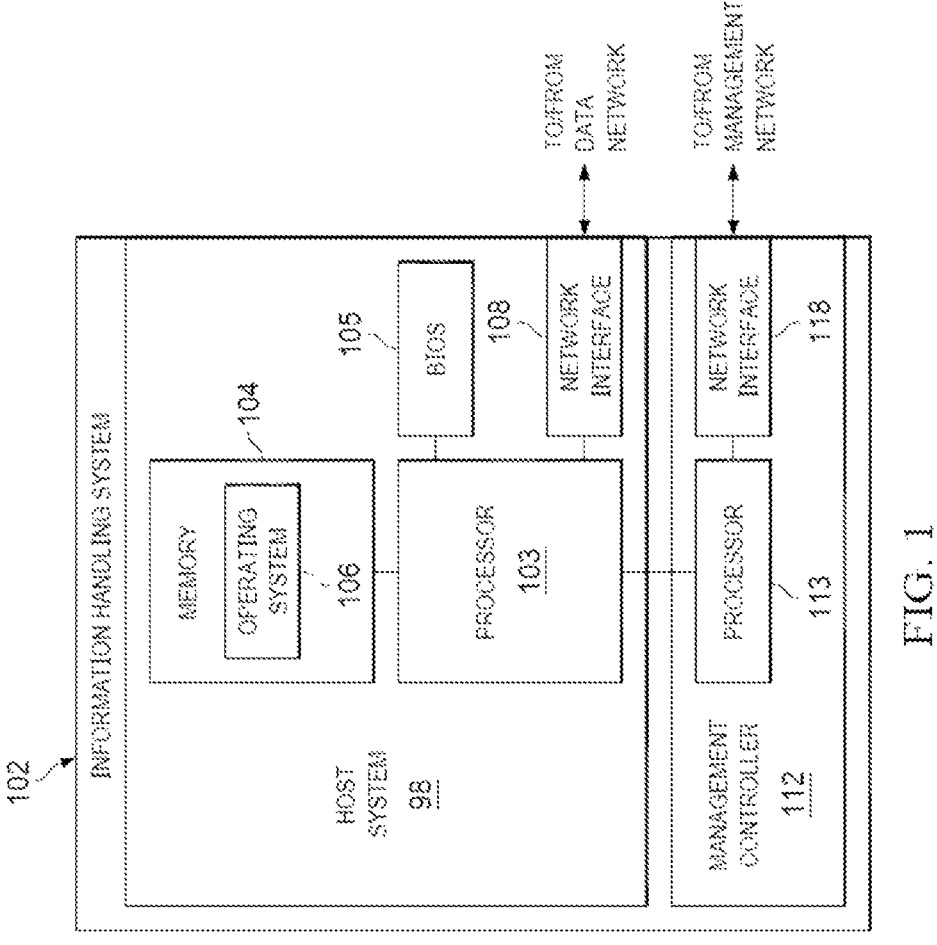
FIG. 1 illustrates a block diagram of an example information handling system, in accordance with embodiments of the present disclosure.
Figure 2:
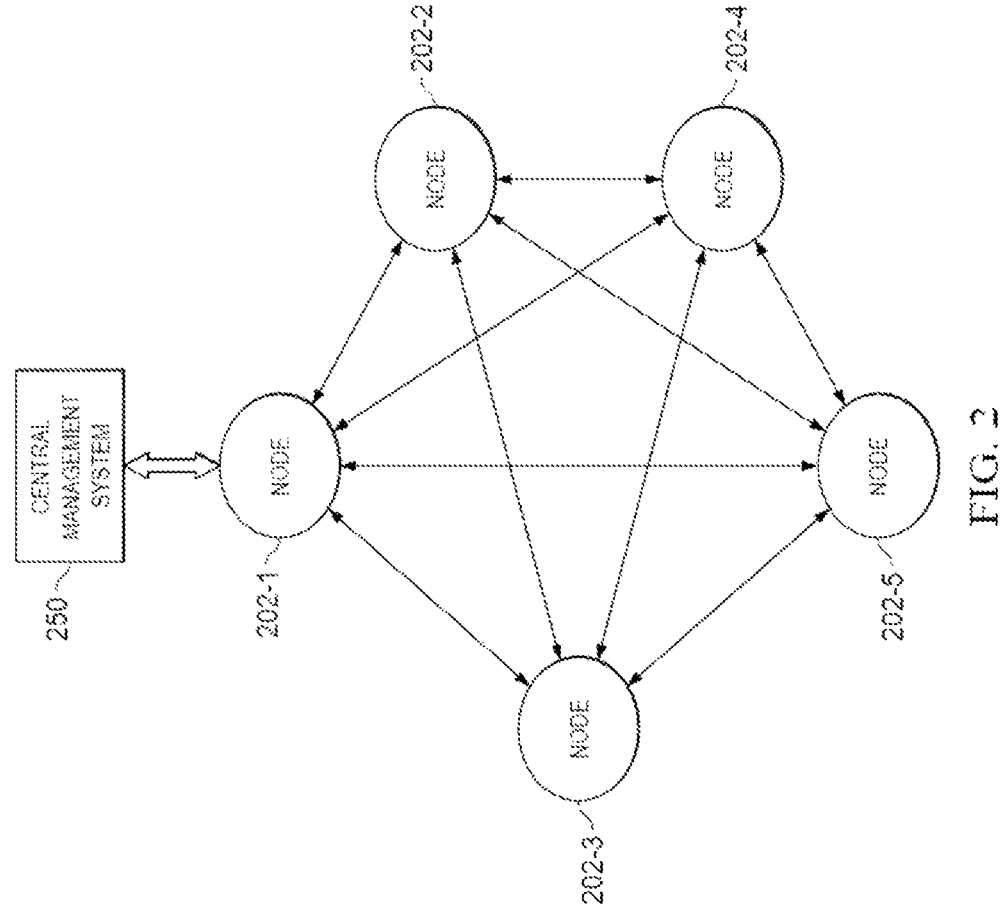
FIG. 2 illustrates a block diagram of an example of an information handling system, in accordance with embodiments of the present disclosure.

Preferred embodiments and their advantages are best understood by reference to the FIGURES, wherein like numbers are used to indicate like and corresponding parts. FIGS. 1 and 2 and the associated descriptions below describe generic features of an information handling system. FIG. 3 and its associated description describe features of the information handling system related to identifying potential security threats.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure provide improvements in management of information handling systems 102 (e.g., edge nodes). It should be noted that while the scenario of an edge deployment is discussed in detail herein for the sake of concreteness, other embodiments are also specifically contemplated within the scope of this disclosure.

In particular, embodiments may employ distributed autonomous edge nodes to assist the centralized management system in performing its management tasks. The centralized management system may communicate with a subset of the edge nodes (e.g., one or more of the edge nodes at each edge deployment) instead of communicating directly with every edge node. Members of this subset may then autonomously communicate with their "neighbors" (e.g., other systems within the same edge deployment) to carry out the management tasks.

By performing status checks and/or distributing management instructions (e.g., configuration changes, updates, etc.) with their neighbors autonomously, the subset of the edge nodes may synchronize configurations across the whole edge deployment and/or the whole HCI system without the need for the centralized management system to communicate directly with every edge node.

In one embodiment, the specific number of neighbors that should be managed by a given edge node in the subset can be calculated by a mathematic model to fit the system's design requirements. In other embodiments, the number of neighbors managed by a given edge node in the subset may be hard-coded or provided as a variable that an administrator may set.

Embodiments may thus provide distributed system management for a large number of edge computing systems. Health checks may be carried out by neighbors in one or more large edge deployments, avoiding the necessity for each edge node to be checked directly by the centralized management system. Configuration changes and updates may also be synchronized between neighbors in large edge deployments, avoiding the necessity for such changes to be provided directly by the centralized management system.

Turning now to FIG. 2, an example architecture is shown for autonomous management of information handling systems. As shown, edge nodes 202-1 through 202-5 (collectively, nodes 202) are communicatively coupled to one another (e.g., via a local edge deployment network). They may also be communicatively coupled to central management system 250 (e.g., via the internet).

In one embodiment, central management system 250 may communicate directly with node 202-1 to perform monitoring and management tasks. The other nodes 202 may communicate (directly or indirectly) with node 202-1, which may act as a portal for status and management information. For example, the other nodes may transmit status information to node 202-1, which may aggregate the information and pass it along to central management system 250. Updates and other management instructions may likewise be sent from central management system 250 to node 202-1, which may distribute them to the other nodes 202.

The communication between node 202-1 and the other nodes 202 may be either direct or indirect. For example, node 202-4 may communicate directly with node 202-1, or it may communicate with node 202-2, which may pass information along to node 202-1.

In one embodiment, each communication may include a time stamp associated therewith to indicate the time of origination. In this way, nodes 202 may determine the order in which instructions such were issued, that later instructions may supersede earlier instructions, etc. Time stamps may further be employed to reduce unnecessary duplication of communications. For example, if one node has broadcast a message to its neighbor nodes, and one of those nodes has already transmitted the message to central management system 250 at a particular time, then the other nodes need not retransmit the message at a later time.

In one embodiment, the arrangement of FIG. 2 may allow neighbors to perform health checks autonomously on one another in the event that communication is lost between central management system 250 and nodes 202. For example, if communication is interrupted between central management system 250 and node 202-1, then central management system 250 may contact node 202-5 and instruct it to perform the functionality previously handled by node 202-1. For example, node 202-5 may then perform health checks, heartbeat monitoring, and other tasks with regard to itself and the other nodes 202, reporting the results to central management system 250.

In one embodiment, this may be triggered based on a lack of communications between node 202-1 and central management system 250 that lasts more than a threshold amount of time. The threshold may be calculated based on a mathematic model that takes into account the characteristics of the node deployment. In other embodiments, the threshold may be hard-coded or provided as a variable that an administrator may set. In one implementation, the communication frequency and timing may incorporate a random or pseudo-random element, such that communications are staggered to avoid overwhelming the network infrastructure.

Turning now to FIG. 3, an example process 300 is shown for providing threat intelligence sharing in an information handling system including edge devices.

At 302, a real-time data stream representing data being processed by the edge node is monitored. For example, a software agent executed by the edge node may analyze portions of the real-time data stream being processed by the edge node. This analysis may be continuous, such that the software agent analyzes all data that is processed by the edge node. In some cases, the software agent may be a program executed by the processor of the edge node. The software agent may also be a set of software instruction (e.g., a library) integrated into the software program that is executed by the edge node to perform data processing tasks. In some implementations, as part of the monitoring, the software agent may analyze portions of the real-time data stream before they are processed by the edge node, so that threats can be identified and action taken (as discussed below) prior to the suspect portion of the real-time data stream being processed by the edge node.

At 304, a potential security threat indicated by at least a portion of the real-time data stream is identified. Identifying the potential security threat may include detecting a network anomaly indicated by at least the portion of the real-time data stream. In some implementations, identifying the potential security threat includes detecting suspicious network behavior by one or more of the plurality of edge nodes indicated by at least the portion of the real-time data stream.

In some cases, identifying the potential security threat is based on a machine-learning model, such as a neural network or other type of model, that is configured to (e.g., has been trained to) identify potential security threats. In some implementations, the machine-learning model is stored in the memory of the edge node.

In operation, portions of the monitored real-time data stream may be provided as input to the machine-learning model, which may output an indication of whether that particular portion of the data stream, either alone or in combination with other portions previously provided as input, is indicative of a potential security threat. For example, a portion of the real-time data stream may contain data that matches or is similar to a message generally sent over a network by a particular type of malicious software. The portion of the real-time data stream may also contain data indicative of an attempt by a malicious party to gain unauthorized access to the edge network, such as, for example, a buffer overflow attack, a man-in-the-middle attack, a Structured Query Language (SQL) injection attack, or other techniques. In response to receiving such data as input, the machine-learning model is configured to provide output indicating the potential security threat.

At 306, in response to identifying the potential security threat, an automated response action is triggered. In some cases, the automated response action may include quarantining one or more edge nodes in the plurality of edge nodes. For example, if the identified potential security threat likely represents anomalous or malicious behavior by the edge node itself, the edge node may isolate itself from all other nodes in the edge network in order to prevent the anomalous or malicious behavior from affecting the other edge nodes. In some cases, the edge node may send an indication to central management system prior to implementing the quarantine. In some implementations, if the identified potential security threat likely represents anomalous or malicious behavior by other edge nodes in the edge network, the edge node may communicate with those nodes or with the central management system to indicate that those other nodes should be quarantined.

In some cases, the automated response action may include alerting security personnel associated with the edge network. For example, the edge node may send an alert, such as an email, a Short Message Service (SMS) text message, or other electronic message, to a configured list of security personnel. In some cases, the alert may include information about the identified potential security threat in order to enable the security personnel to investigate and address the potential security threat.

In some cases, the automated response action may include alerting a security system in the edge network. For example, the edge node may send an electronic message including information about the identified potential security threat to a configured network address associated with the security system. In some cases, the electronic message may be a broadcast message. In some implementations, the electronic message may be formatted according to a network management protocol such as, for example, Simple Network Management Protocol (SNMP) or other protocols.

At 308, a description of the identified potential security threat is communicated to the other edge nodes in the plurality of edge nodes. In some cases, communicating the description of the identified potential security threat to the other edge nodes in the plurality of edge nodes includes communicating the description to at least one other edge node, and wherein the communicated description is propagated to the remaining plurality of edge nodes. In some implementations, an edge node receiving such a description of an identified potential security threat may update its stored machine-learning model based on the received threat.

In some implementations, process 300 may include updating the machine-learning model based on an actual threat determination associated with the identified potential security threat, wherein the machine-learning model is configured to identify potential security threats. In some cases, this actual threat determination may be made by external security systems or personnel after the identification of potential security threat by the edge node. The actual threat determination may include a corrective assessment of the identified threat that is configured to update the machine-learning model's threat identification capability. For example, if the identified potential security threat was determined to not, in fact, represent a security threat, the corrective assessment would cause the machine-learning model to be less likely to identify similar portions of the real-time data stream as potential security threats in the future. This type of feedback mechanism for updating the machine-learning model may be implemented according to various methods that are well-known in the art.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. A system comprising:
   a plurality of edge nodes, each edge node including at least one processor and a memory and being in communication with at least one other edge node via a communications network, wherein each edge node is configured to perform operations including:
   monitoring a real-time data stream representing data being processed by the edge node;
   identifying a potential security threat indicated by at least one portion of the real-time data stream;
   in response to identifying the potential security threat, triggering an automated response action, wherein the automated response action includes quarantining a particular edge node associated with the potential security threat by isolating the particular edge node from other ones of the plurality of edge nodes;

communicating a description of the identified potential security threat to the other edge nodes in the plurality of edge nodes; and updating a machine-learning model based on an actual threat determination associated with the identified potential security threat, wherein the machine-learning model is configured to identify potential security threats, and wherein the machine-learning model is stored in the memory of the edge node.

2. The system of claim 1, wherein identifying the potential security threat is based on the machine-learning model.

3. The system of claim 1, wherein the automated response action further includes at least one of alerting security personnel, or alerting a security system in the edge network.

4. The system of claim 1, wherein identifying the potential security threat includes detecting a network anomaly indicated by at least the portion of the real-time data stream.

5. The system of claim 1, wherein identifying the potential security threat includes detecting suspicious network behavior by one or more of the plurality of edge nodes indicated by at least the portion of the real-time data stream.

6. The system of claim 1, wherein communicating the description of the identified potential security threat to the other edge nodes in the plurality of edge nodes includes communicating the description to at least one other edge node, and wherein the communicated description is propagated to the remaining plurality of edge nodes.

7. A method for detecting security threats in an edge network including a plurality of edge nodes, each edge node including at least one processor and a memory and being in communication with at least one other edge node via a communications network, the method comprising:

monitoring a real-time data stream representing data being processed by the edge node;

identifying a potential security threat indicated by at least a portion of the real-time data stream;

in response to identifying the potential security threat, triggering an automated response action, wherein the automated response action includes quarantining a particular edge node associated with the potential security threat by isolating the particular edge node from other ones of the plurality of edge nodes;

communicating a description of the identified potential security threat to the other edge nodes in the plurality of edge nodes; and updating a machine-learning model based on an actual threat determination associated with the identified potential security threat, wherein the machine-learning model is configured to identify potential security threats, and wherein the machine-learning model is stored in the memory of the edge node.

8. The method of claim 7, wherein identifying the potential security threat is based on the machine-learning model.

9. The method of claim 7, wherein the automated response action further includes at least one of alerting security personnel, or alerting a security system in the edge network.

10. The method of claim 7, wherein identifying the potential security threat includes detecting a network anomaly indicated by at least the portion of the real-time data stream.

11. The method of claim 7, wherein identifying the potential security threat includes detecting suspicious network behavior by one or more of the plurality of edge nodes indicated by at least the portion of the real-time data stream.

12. The method of claim 7, wherein communicating the description of the identified potential security threat to the other edge nodes in the plurality of edge nodes includes communicating the description to at least one other edge node, and wherein the communicated description is propagated to the remaining plurality of edge nodes.

13. An article of manufacture comprising a non-transitory, computer-readable medium having computer-executable instructions thereon that are executable by a processor of an edge node of an information handling system including a plurality of edge nodes to perform operations comprising:

monitoring a real-time data stream representing data being processed by the edge node;

identifying a potential security threat indicated by at least a portion of the real-time data stream;

in response to identifying the potential security threat, triggering an automated response action, wherein the automated response action includes quarantining a particular edge node associated with the potential security threat by isolating the particular edge node from other ones of the plurality of edge nodes;

communicating a description of the identified potential security threat to the other edge nodes in the plurality of edge nodes; and updating a machine-learning model based on an actual threat determination associated with the identified potential security threat, wherein the machine-learning model is configured to identify potential security threats, and wherein the machine-learning model is stored in a memory of the edge node.

14. The article of claim 13, wherein identifying the potential security threat is based on the machine-learning model.

*     *     *     *     *